US010917237B2

(12) United States Patent
Fenner

(10) Patent No.: US 10,917,237 B2
(45) Date of Patent: Feb. 9, 2021

(54) ATTESTABLE AND DESTRUCTIBLE DEVICE IDENTITY

(71) Applicant: Microsoft Technology Licensing, LLC, Redmond, WA (US)

(72) Inventor: Christopher E. Fenner, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 134 days.

(21) Appl. No.: 15/954,356

(22) Filed: Apr. 16, 2018

(65) Prior Publication Data

US 2019/0319790 A1  Oct. 17, 2019

(51) Int. Cl.
*H04L 9/32* (2006.01)
*H04L 9/08* (2006.01)
*H04L 9/06* (2006.01)
*G06F 9/54* (2006.01)
*H04L 9/14* (2006.01)

(52) U.S. Cl.
CPC .............. *H04L 9/0869* (2013.01); *G06F 9/54* (2013.01); *H04L 9/0643* (2013.01); *H04L 9/14* (2013.01); *H04L 9/3242* (2013.01)

(58) Field of Classification Search
CPC ..... H04L 9/00; H04L 9/30; H04L 9/32; H04L 9/34; H04L 9/06; H04L 9/08; H04L 9/006; H04L 9/008; H04L 9/0869; H04L 9/0643; H04L 9/14; H04L 9/3242; G06F 21/00; G06F 21/30; G06F 21/57; G06F 21/54
USPC ....................................................... 713/171
See application file for complete search history.

(56) References Cited

U.S. PATENT DOCUMENTS

| 10,474,554 | B2* | 11/2019 | Frank .................. G06F 11/3006 |
| 2003/0196100 | A1* | 10/2003 | Grawrock ........... G06F 12/1433 |
| | | | 713/193 |
| 2012/0246470 | A1* | 9/2012 | Nicolson ................. G06F 21/51 |
| | | | 713/158 |
| 2012/0265976 | A1 | 10/2012 | Spiers et al. |

FOREIGN PATENT DOCUMENTS

WO   2011102087 A1   8/2011

OTHER PUBLICATIONS

Ariel Segall :::Using the TPM: Machine Authentication and Attestation Day:2 (Year: 2015).*
Will Arthur and David Challener with Kenneth Goldman : A practical Guide to TPM 2.0 (Year: 2015).*
Justin D. Osborn and David C. Challener ::Trusted Platform Module Evolution (Year: 2013).*
"International Search Report and Written Opinion Issued in PCT Application No. PCT/US2019/025086", dated Jun. 25, 2019, 10 Pages.

* cited by examiner

Primary Examiner — Samson B Lemma
(74) Attorney, Agent, or Firm — Holzer Patel Drennan

(57) ABSTRACT

Implementations described herein disclose a device identity management system using a trusted platform module (TPM) of a device. The device identity management system provides one or more computer executable instructions to receive a secret random number at a trusted platform module (TPM) of a device, generate a hash of an existing device identity stored in a non-volatile (NV) identity index using the secret random number, and store the hash as the device identity in the NV identity index.

20 Claims, 6 Drawing Sheets

ATTESTABLE AND DESTRUCTIBLE DEVICE IDENTITY

BACKGROUND

Trusted computing (TC) has become an important part of the computing landscape over the last few years. This is because email viruses, trojans, spyware, phishing scams, key-stroke loggers, and security exploits are so much a part of the landscape already, and trusted computing addresses these challenges not only with computing devices such as desktops and laptops, but also with mobile devices and with devices used with the Internet of things (IoT) technology. With TC, the computing device consistently behaves in expected ways, and those behaviors are enforced by computer hardware and software. Specifically, enforcing this behavior is achieved by loading the hardware with a unique encryption key (EK) that is inaccessible to the rest of the system.

SUMMARY

Implementations described herein disclose a device identity management system using a trusted platform module (TPM) of a device. The device identity management system provides one or more computer executable instructions to receive a secret random number at a trusted platform module (TPM) of a device, generate a hash of an existing device identity stored in a non-volatile (NV) identity index using the secret random number, and store the hash as the device identity in the NV identity index.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Figure 1:
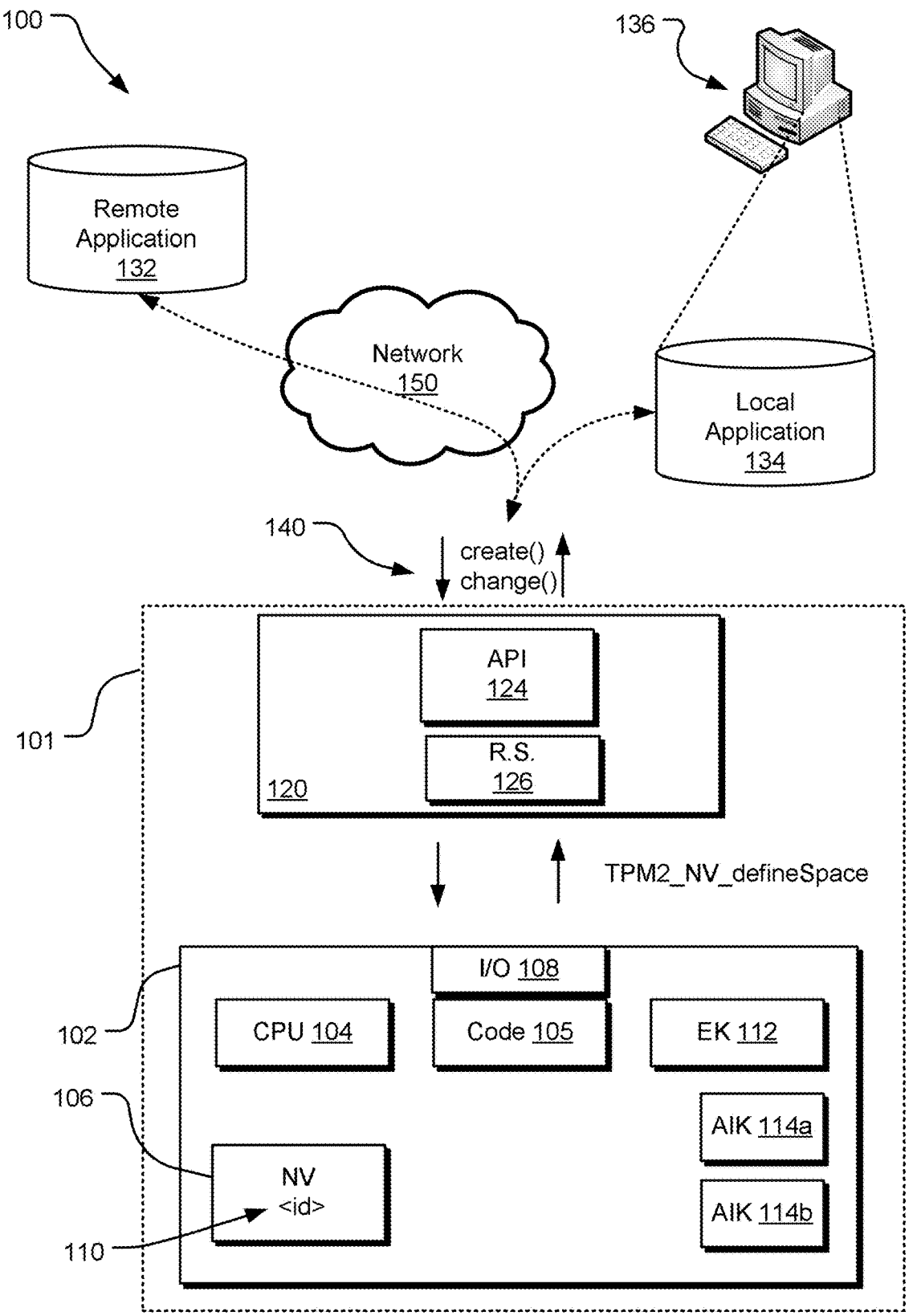
FIG. 1 illustrates an example implementation of a system for attestable and destructible device identity.

Implementations disclosed here provide a device identity management system using a trusted platform module (TPM) of a device. Trusted platform module (TPM) is a public standard for hardware cryptography. A TPM is designed to provide hardware-based security-related functions. A TPM chip is a secure crypto-processor that is designed to carry out cryptographic operations. The TPM chip may include multiple physical security mechanisms to make it tamper resistant such that malicious software is unable to tamper with the security functions of the TPM. Various implementations of TPM may be capable of doing symmetric and asymmetric cryptography as well as various other operations for attesting to various things that are true about a device to which that TPM is connected. A TPM may be thought of as a keychain and the TPM may provide attestation that the given key in the keychain is actually in the keychain and not somewhere else.

In one implementation, the TPM for a device may be provided as part of a device. For example, a TPM may be part of a device's microprocessor. Alternatively, a TPM may be a discrete component of the device implemented on a chip that is connected to the motherboard of the device. In such an implementation, the TPM chip may communicate with the microprocessor of the device using the system bus of the device.

A TPM may be implemented to have non-volatile memory (NVM) to store one or more keys, including an endorsement key (EK). An EK may be an asymmetric key contained inside the TPM. For example, the EK may be injected at manufacturing time of the TPM. The EK is unique for every TPM and may identify the TPM. Specifically, the EK cannot be changed or removed from the TPM. In an example implementation, the EK may be a 2048-bit RSA key, or other key with encryption that is supported by the hardware of the device. A public portion of this key is referred to as EKPub and the associated private key is referred to as the EKPriv. Some TPM chips also have an EK certificate that is issued by the manufacturer for the EKPub. This cert is referred to as EKCert.

In one implementation, EK is a decryption key that is only allowed to be used to attest other keys, such as an attestation identity key (AIK) in the TPM. Thus, EK can be used to develop trust in other keys in the TPM. Furthermore, an EK may also be used to develop additional AIKs in the TPM, in which case the EK has one-to-many relation with these AIKs. In such implementations, the additional AIKs may be used to sign other restricted statements. For example, if the device is doing some transactions with an online merchant that requires TPM based attestation, the device can use an AIK to provide such attestation. This way, the device can use separate AIK for attestation with each of the various third parties such as an online social network, a mobile service provider, an online merchant, etc.

An implementation disclosed herein provides attestable and destructible identity that are based in the NVM of the TPM. Specifically, in an implementation, a device identity management system disclosed herein includes a number of computer executable instructions that can generate device identities that are attestable and destructible. Specifically, such device identities are generated by performing a hashing operation on a random secret provided to the TPM. The result of the hashing operation can be attested by an AIK of the TPM. The device identity generated by the hashing of the random secret may be stored in an identity index in the NVM of the TPM. For example, the identity index is a 32-bit address of the NV data that was created and stored in the TPM.

Furthermore, the device identity in the identity index is destructible in that another random secret may be provided and a hashing operation using this other random secret on the current device identity will result in a new device identity while at the same time resulting in destruction of the current device identity. Storing the device identity in the NVM of the TPM ensures that the identity is persistent even when the system is reset, the virtual memory of the system is deleted, etc. A TPM may have approximately 4K-10K of NVM, which allows the implementations disclosed herein to store sufficient number of device identities.

FIG. 1 illustrates an example implementation of a device identity management system 100 for providing attestable and destructible device identity. The device identity management system 100 may be implemented on a computing device 101 that is configured to have a TPM 102 thereon. The computing device 101 may be any computing device, such as a laptop, a desktop, or a mobile computing device. An example of a computing device and its components are further disclosed in FIG. 6 below.

In the implementation of the device identity management system 100, the TPM 102 may include a processing unit or CPU 104 and non-volatile (NV) memory 106, and an input/output (I/O) module 108. The TPM 102 may communicate with an operating system (OS) 120 of the computing device 101 using the I/O module 108. For example, the I/O module 108 may communicate with the OS 120 using a communication bus such as the system bus 23 disclosed in FIG. 6.

One or more external applications such as a remote application 132 or a local application 134 may communicate with the computing device 101 to request an attestable device identity of the computing device 101. For example, the remote application 132 may send a create( ) command via a network 150 to the computing device 101 to create a new attested identification of the computing device 101. For example, an API 124 exposed by the OS 120 may allow such applications 132, 134 to communicate the request to the OS 120. In response to the request for the attestable device identity, the OS 120 generates a random secret 126 and extends the random secret 126 with a request of an attestable identity to the TPM 102. The random secret 126, for example, may be a 256-bit random number. In an alternative implementation, the random secret 126 may be generated in some other manner in an alternative implementation, the OS 120 may generate an attestable identity for the device without being prompted to do so by any remote device. The OS 120 may communicate with the TPM 102 using a TPM command 102, such as TPM2_NV_DefineSpace. For example, in response to create( ) command, two commands get executed, specifically, the TPM2_NV_DefineSpace (attributes include NV_Extend) creates an index, whereas TPM2_NV_Extend (data is the random data produced by the OS) extends the random secret into the index.

After the attestable identity for the device is created, it may be attested by an AIK in response to a get_attested( ) command via the network 150 from the remote application 132. In response to this request, the OS 120 will use a TPM command TPM2_NV_Certify to obtain a statement of the current attestable identity, signed by an AIK. Thus, the TPM2_NV_Certify command allows the remote application 132 to request the signed statement of the device's current identity.

The TPM 102 may have a series of computer instructions, referred to as the code 105 that are executable on the CPU 104 to generate an identity that can be stored on the identity index 110 using the random secret 126 received from the OS 120. Specifically, the code 105 may perform a hash of the random secret 126 using a hashing algorithm to generate an identity that is added to the identity index 110. In one implementation, the hashing algorithm may be SHA-256, however, alternative hashing algorithm may also be used. The SHA-256 algorithm generates a 256-bit hash value. The identity index 110 is stored on the NV 106 of the TPM 102 and is therefore persistent.

Furthermore, the applications 132, 134 may also communicate with the API 124 to destruct the attestable identity of the computing device 101 or to change the attestable identity. For example, the API 124 may have exposed a change( )instruction that may be used by the applications 132, 134 to communicate such a request for changing or destructing the attestable identity of the computing device 101. In response to such change/destruct request 140, the OS 120 generates another random secret 126. As this newly generated random secret 126 is randomly generated, it is statistically infeasible for the secret to be the same as the initially generated random secret 126. Moreover, if the index is not deleted (TPM2_NV_UndefineSpace) and re-created before being changed, the new value will be the result of hashing operations over the original secret as well as the new one, meaning that even if the newly generated random secret were under the control of a malicious entity, the final identity would still contain, as part of its hash calculation, secret data unknown to the entity calling for a change in identity.

In response to receiving the new random secret 126, the code 105 requests the TPM to generate a new hash using the new random secret 126 and the current value of the attestable identity stored in the identity index 110 in the NV 106. The newly generated hash is also saved in the identity index 110.

The TPM 102 may also include an EK 112 and one or more AIKs 114a, 114b, etc. Specifically, the EK 112 and the AIKs 114a, 114b may have one-to-many relation such that the AIKs 114a, 114b may be generated by the EK 112. The AIKs may be used to sign other restricted statements such as attestation of an identity in the identity index 110. Thus, if the computing device 101 is doing some transactions with an application 132 that requires a TPM based attestation, the computing device 101 can use the AIK 114a to provide such attestation for a device identity stored in the identity index 110.

Figure 2:
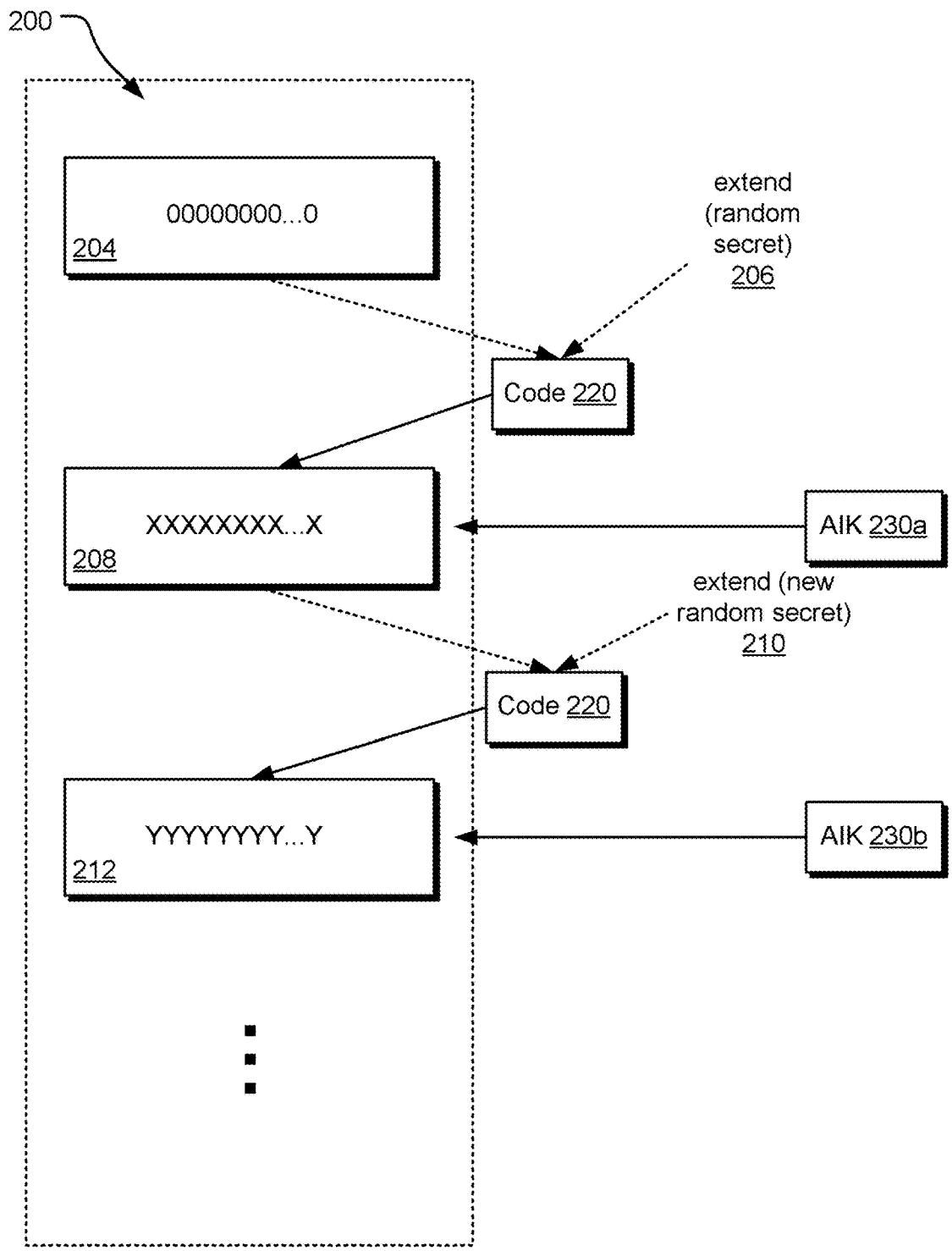
FIG. 2 illustrates an example implementation of a non-volatile identity index according to implementations disclosed herein.

FIG. 2 illustrates an example implementation of an identity index 200 according to implementations disclosed herein. The identity index 200 may be stored in an NVM of a TPM of a computing device. The NV identity index 200 works like a platform configuration registers (PCRs) of a TPM in that they are also in the NV of the TPM. Thus, the NV identity index 200 keeps its values until the TPM is cleared or the identity index is deleted.

When a TPM of a computing device is initiated, initial value of a register 204 is set to all zeros. The length of the register 204 may depend on the type of hashing algorithm used for generating the identity values of the identity index 200. For example, if the hashing algorithm is SHA-256, the register 204 has 256 bits. When a new attestable and destructible identity is requested, a random secret is extended to the TPM at 206. In one implementation, the device that is responsible to come up with the new identity is also responsible for extending the random secret to the NV extend index. Such random number may be a 256-bit random number. Alternatively, an operating system of the device generates the random secret. The hashing code 220 of the TPM generates a hash value using the initialized value 204 and the random secret 206 to generate an attestable and destructible device identity 208. For example, the newly generated device identity 208 may have a value of XXXXXXXX . . . X. The device identity 208 is attestable because an AIK of the TPM may attest its presence in the NVM of the TPM.

The device identity 208 may be used as an unlock identity for the device. For example, the device cannot attest to the value of the device identity 208 using a key in the TPM. For example, an AIK 230a of the TPM may attest the device identity 208 at an attestation operation. Furthermore, the AIK 230a can be used to sign a statement using the value of the device identity 208.

The device identity 208 is destructible because it can be changed with a new random secret. For example, in response to request for destruction of the device identity or a change to the device identity, a new random secret is extended at 210 to the TPM. The code 220 of the TPM generates a new hash value YYYYYYYY . . . Y using the current device identity 208 and the random secret 210. The new hash value is stored in the identity index 200 as the device identity 212. An AIK 230b of the TPM may attest the device identity 212 at an attestation operation. Since the original identity XXXX . . . X was the result of one or more hash calculations over a secret random value, the original identity can never be re-created on any device.

Figure 3:
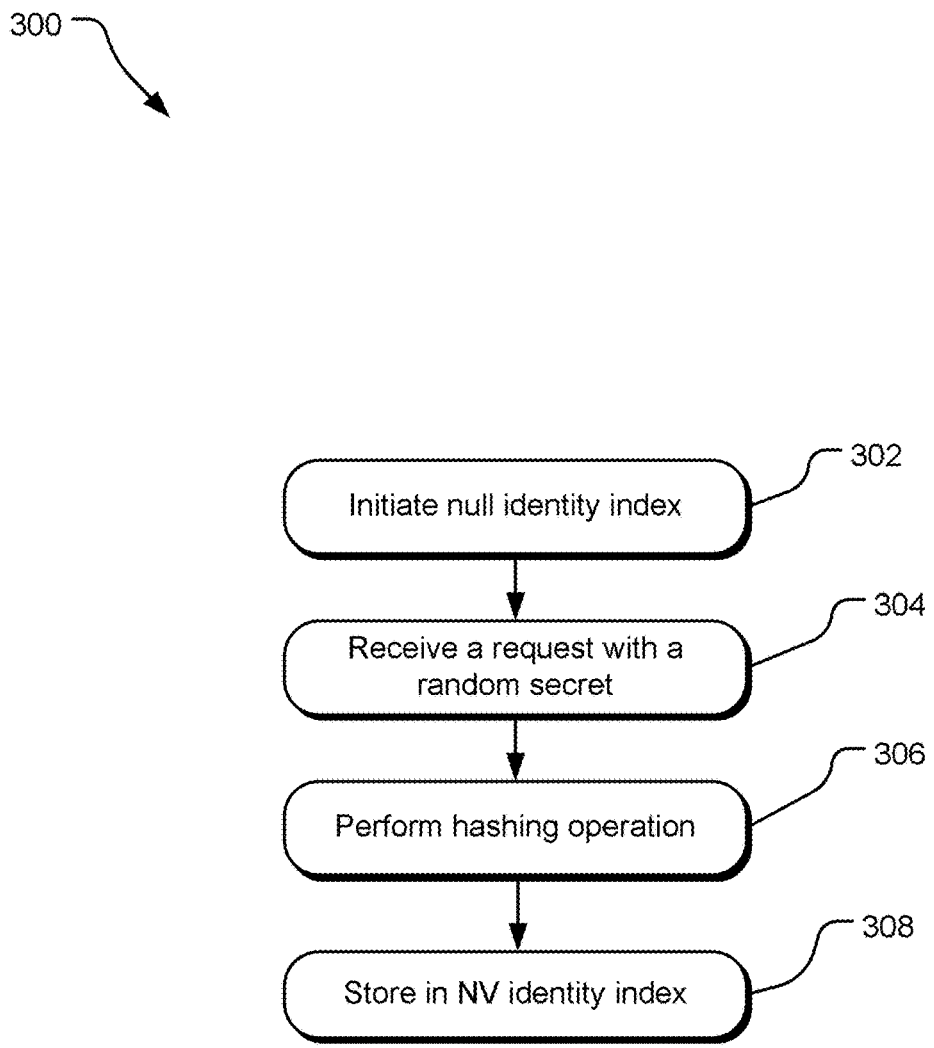
FIG. 3 illustrates example operations for generating a non-volatile identity index according to implementations disclosed herein.

FIG. 3 illustrates example operations 300 for generating a non-volatile identity index according to implementations disclosed herein. The operations 300 may be implemented in a TPM of a device. Specifically, an operation 302 initiates a null identity index in the NV of a TPM. Such null identity index may only have one entry with all values set to null. An operation 304 receives a request to generate an attestable and destructible device identity. For example, such a request may be generated by an operating system of a device. The request also includes a secret random number, such as a 256-bit random number. An operation 306 performs a hashing operation on the identity with null values and the secret random number received at the operation 304 to generate a new device identity. In one implementation, the hashing operation may be SHA-256. The result of the hashing operation 306 is stored as a new device identity in the identity index stored in the NV of the TPM.

Figure 4:
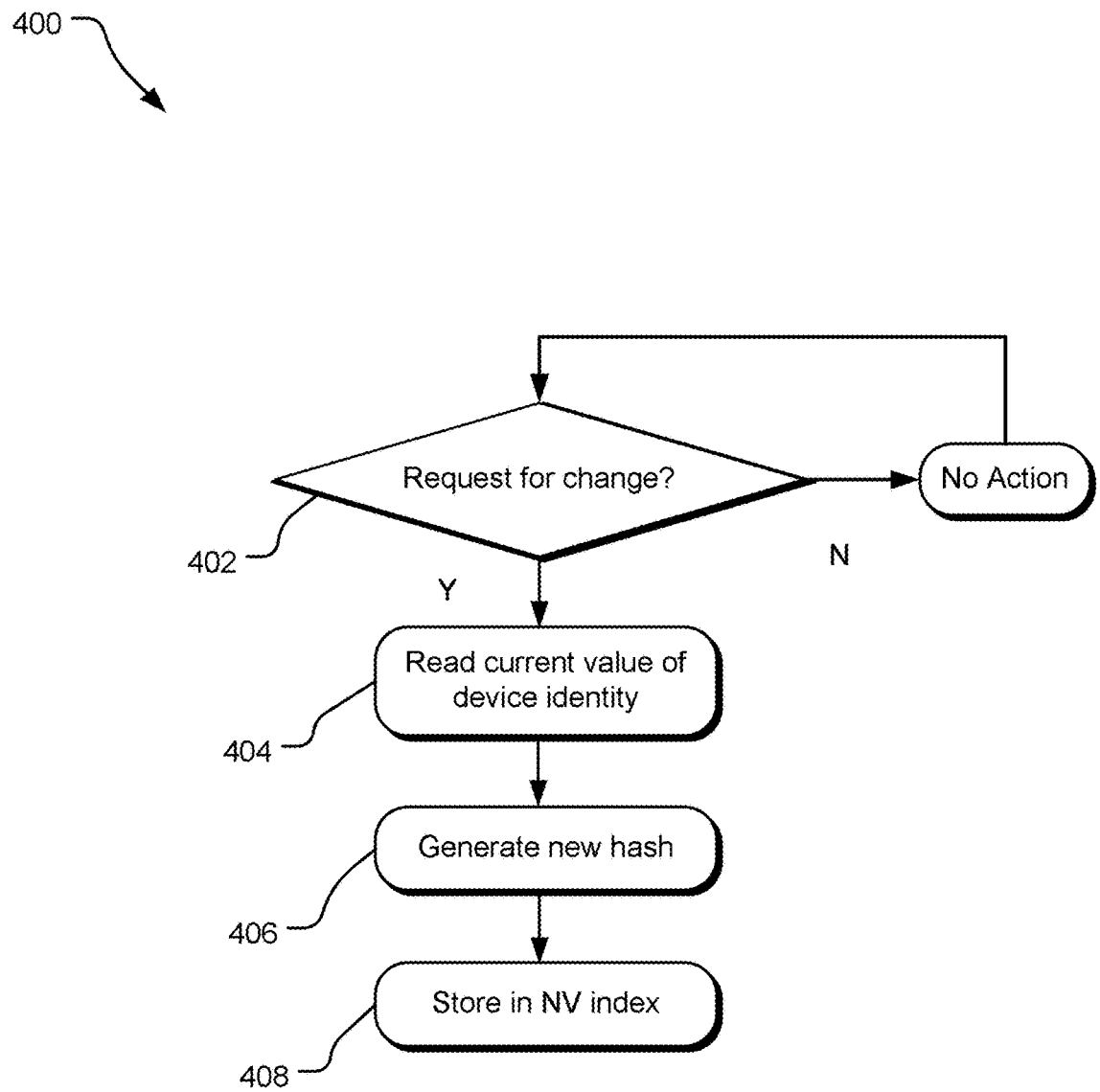
FIG. 4 illustrates example operations for changing a non-volatile identity index according to implementations disclosed herein.

FIG. 4 illustrates example operations 400 for changing a non-volatile identity index according to implementations disclosed herein. The operations 400 may be implemented in a TPM of a device. An operation 402 determines if a request for change to a device identity is received. For example, such request may be received from an operating system of the device and if so, it includes a secret random number. If so, an operation 404 reads the current value of the device identity, which may be a hash generated in a previous hashing operation or a null. An operation 406 generates a new hash using the current value of the device identity and any newly received random secret to generate a new value of the device identity, which is stored in the NV identity index at operation 408.

Figure 5:
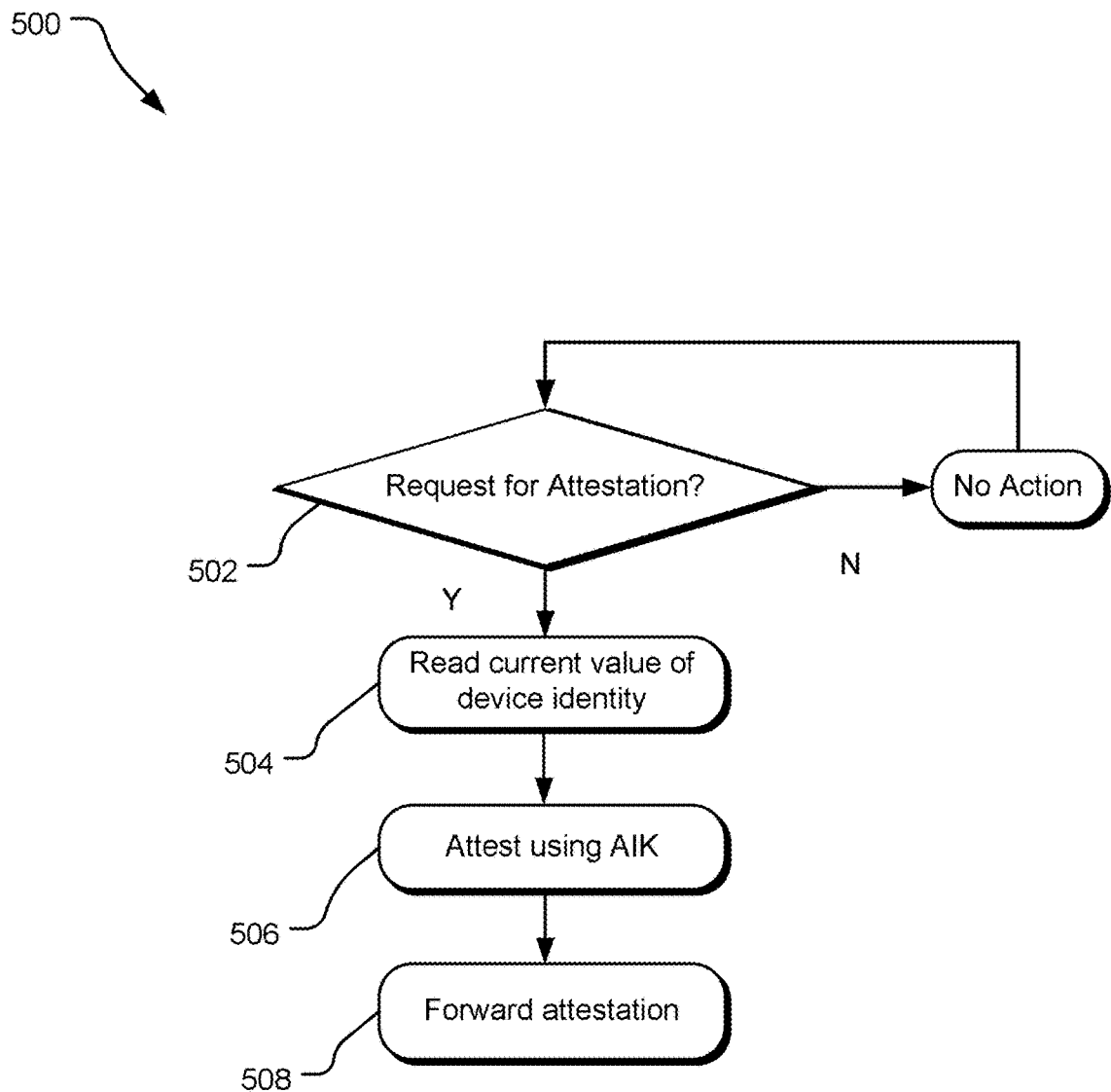
FIG. 5 illustrates example operations for providing attestation using the non-volatile identity index according to implementations disclosed herein.

FIG. 5 illustrates example operations 500 for providing attestation using the non-volatile identity index according to implementations disclosed herein. The operations 500 may be implemented in a TPM of a device. An operation 502 determines if a request for device attestation is received. If so, an operation 504 reads the current value of the device identity, which may be a hash generated in a previous hashing operation. An operation 506 attests to the value of the device identity using an AIK of the TPM and such attestation is forwarded to the requesting application at operation 508.

Figure 6:
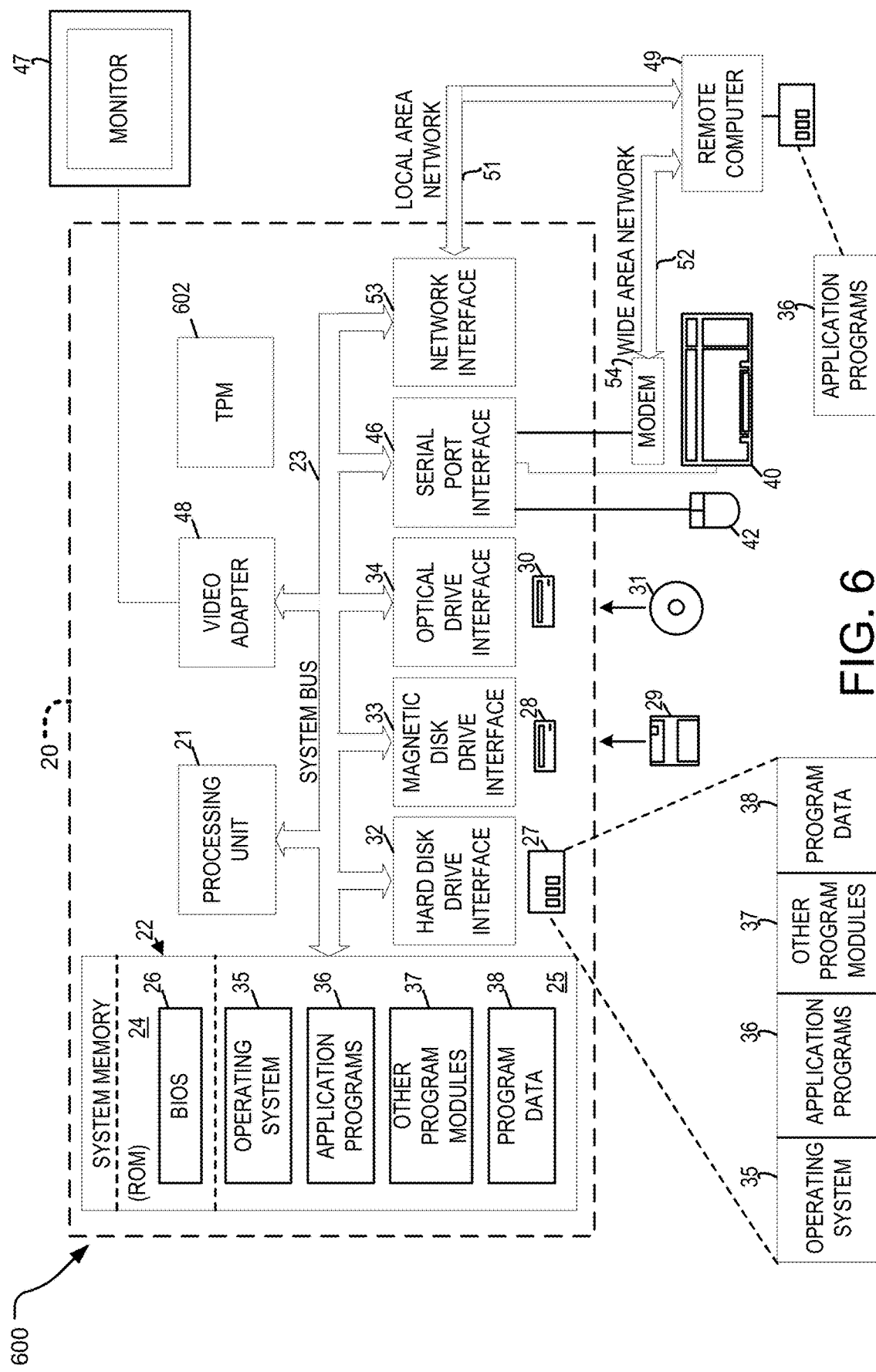
FIG. 6 illustrates an example system that may be useful in implementing the described technology.

FIG. 6 illustrates an example system 600 that may be useful in implementing the described technology for providing attestable and destructible device identity. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. Rules for providing attestable and destructible device identity may be stored in memory 22 and/or storage devices 29 or 31 as persistent datastores. For example, a TPM module 602 may be implemented on the computer 20 (alternatively, the TPM module 602 may be implemented on a server or in a cloud environment). The TPM module 602 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for providing attestable and destructible device identity may include a variety of tangible computer-readable storage media and intangible computer-readable communication signals. Tangible computer-readable storage can be embodied by any available media that can be accessed by the attestable and destructible device identity system 100 (as disclosed in FIG. 1) and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the attestable and destructible device identity system 100 (as disclosed in FIG. 1). In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The trusted device identity management system disclosed herein provides a solution to a technological problem necessitated by problem of developer unlock/relock and licensing of computing devices. Specifically, the trusted device identity management system disclosed herein provides an unconventional technical solution to this technological problem by providing TPM based identity index to store attestable and destructible device identity that is generated using a secret random number and generating a hash using the random secret.

For example, a phone with this technology may be able to register itself as a developer device so that the developer can run un-signed test software on it. In that case, an attestation service registers the identity of the device to the developer's license and signs a statement that authenticates another component on the phone to run un-signed code. A TPM-aware component may even be set up to verify the current state of the phone's identity before allowing un-approved software to run on the phone. Similarly, a personal computer (PC) with this technology may register itself as a registered user of some software. An attestation service registers the identity of the device to the user's license and signs a statement that authenticates the software to run on that PC. A TPM-aware component could even be set up to verify the current state of the PC's identity before allowing the program to launch. In both of these cases, when the license expires, a server or a remote application can request the device identity be changed and ask for attestation of the new identity of the device (proving that the old identity is gone and can never be used again).

Furthermore, a server or a remote application may also insert additional secret randomness into the identity so that it can be certain that not all the randomness that composes the device's identity is known to the device, even on a hacked/malicious operating system. This is done by extending the identity to the device in an encrypted TPM session using a shared secret encrypted to a new storage key attested by the AIK already in use to attest to the identity of the device. Furthermore, a remote application may also request a proof that the device identity has been actually modified using the secret known to the remote application by requesting an attestation statement from the TPM of the device over the new identity, verifying it matches the value calculated by the remote application based on the old identity and the secret randomness it provided in the encrypted session.

A physical article of manufacture disclosed herein includes one or more tangible computer-readable storage media, encoding computer-executable instructions for executing on a computer system a computer process to provide attestable and destructible device identity, the computer process comprising receiving a secret random number at a trusted platform module (TPM) of a device, generating a hash of an existing device identity stored in a non-volatile (NV) identity index using the secret random number, and storing the hash as the device identity in the NV identity index. In one implementation, the TPM receives the secret random number from an operating system of the device. In another implementation, the secret random number is a 256-bit number and generating a hash comprises creating a hash using SHA-256 hashing algorithm.

Alternatively, the computer process further comprises attesting the identity of the device in the identify index using an attestation identity key (AIK) of the TPM. Yet alternatively, the computer process further comprises attesting the identity of the device in the identify index using a salted encryption key (EK) of the TPM. In another implementation, the computer process further comprises destroying the device identity by generating a hash of the existing device identity using a new value of the secret random number. Alternatively, the computer process further comprises destroying the device identity by deleting the identify index. Yet alternatively, the computer process further comprises exposing the identity index to applications using an application programming interface (API) that supports at least one of a create identity call and a change identity call. In another implementation, the computer process further comprises relocking the device by extending a new secret random number to the TPM and generating a new hash using the new secret random number and the current device identity.

A method disclosed herein includes receiving a secret random number at a trusted platform module (TPM) of a device, generating a hash of an existing device identity stored in a non-volatile (NV) identity index using the secret random number, and storing the hash as the device identity in the NV identity index. In an alternative implementation, the TPM receives the secret random number from an operating system of the device. Alternatively, the secret random number is a 256-bit number and generating a hash comprises creating a hash using SHA-256 hashing algorithm. Yet alternatively, the method further includes attesting the identity of the device in the identify index using at least one of an attestation identity key (AIK) of the TPM and a salted EK of the TPM.

In one implementation, the method further includes destroying the device identity by generating a hash of the existing device identity using a new value of the secret random number. In another implementation, the method further includes relocking the device by extending a new secret random number to the TPM and generating a new hash using the new secret random number and the current device identity. Yet alternatively, the method further includes exposing the identity index to applications using an application programming interface (API) that supports at least one of a create identity call and a change identity call.

A system disclosed herein includes memory, one or more processor units, and a device identity management system stored in the memory and executable by the one or more processor units, the device identity management system encoding computer-executable instructions on the memory for executing on the one or more processor units a computer process to provide malware sequence detection, the computer process comprising receiving a secret random number at a trusted platform module (TPM) of a device, generating a hash of an existing device identity stored in a non-volatile (NV) identity index using the secret random number, and storing the hash as the device identity in the NV identity index.

In one implementation of the system, the computer process further includes attesting the identity of the device in the identify index using an attestation identity key (AIK) of the TPM. Alternatively, the computer process further includes destroying the device identity by generating a hash of the existing device identity using a new value of the secret random number. Yet alternatively, the computer process further includes exposing the identity index to applications using an application programming interface (API) that supports at least one of a create identity call and a change identity call.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more non-transitory tangible computer-readable storage media, encoding computer-executable instructions for executing on a computer system a computer process to provide attestable and destructible device identity, the computer process comprising:

receiving a secret random number at a trusted platform module (TPM) of a device;

using the secret random number, generating a hash of an existing device identity stored in a non-volatile (NV) identity index, wherein the NV identity index is stored within the TPM; and storing the hash of the existing device identity as a new device identity in the NV identity index.

2. The physical article of manufacture of claim 1, wherein the TPM receives the secret random number from an operating system of the device.

3. The physical article of manufacture of claim 1, wherein the secret random number is a 256-bit number and generating a hash comprises creating a hash using SHA-256 hashing algorithm.

4. The physical article of manufacture of claim 1, wherein the computer process further comprising attesting the new identity of the device in the NV identity index using an attestation identity key (AIK) of the TPM.

5. The physical article of manufacture of claim 1, wherein the computer process further comprising attesting the new identity of the device in the NV identity index using a salted encryption key (EK) of the TPM.

6. The physical article of manufacture of claim 1, wherein the computer process further comprising destroying the existing device identity by generating a hash of the existing device identity using a new value of the secret random number.

7. The physical article of manufacture of claim 1, wherein the computer process further comprising destroying the existing device identity by deleting the NV identity index.

8. The physical article of manufacture of claim 1, wherein the computer process further comprising exposing the identity index to applications using an application programming interface (API) that supports at least one of a create identity call and a change identity call.

9. The physical article of manufacture of claim 1, wherein the computer process further comprising relocking the device by extending a new secret random number to the TPM and generating a new hash using the new secret random number and the existing device identity.

10. In a computing environment, a method performed at least in part on at least one processor, the method comprising:

receiving a secret random number at a trusted platform module (TPM) of a device;

using the secret random number, generating a hash of an existing device identity stored in a non-volatile (NV) identity index, wherein the NV identity index is stored within the TPM; and storing the hash of the existing device identity as a new device identity in the NV identity index.

11. The method of claim 10, wherein the existing device identity and the new device identity are attestable device identities.

12. The method of claim 10, wherein the secret random number is a 256-bit number and generating a hash comprises creating a hash using SHA-256 hashing algorithm.

13. The method of claim 10, further comprising attesting the identity of the device in the identify index using at least one of an attestation identity key (AIK) of the TPM and a salted EK of the TPM.

14. The method of claim 10, further comprising destroying the existing device identity by generating a hash of the existing device identity using a new value of the secret random number.

15. The method of claim 10, further comprising relocking the device by extending a new secret random number to the TPM and generating a new hash using the new secret random number and the existing device identity.

16. The method of claim 10, further comprising exposing the identity index to applications using an application programming interface (API) that supports at least one of a create identity call and a change identity call.

17. In a computing environment, a system comprising:

memory;

one or more processor units;

a device identity management system stored in the memory and executable by the one or more processor units, the device identity management system encoding computer-executable instructions on the memory for executing on the one or more processor units a computer process to provide malware sequence detection, the computer process comprising:

receiving a secret random number at a trusted platform module (TPM) of a device;

using the secret random number, generating a hash of an existing attestable device identity stored in a non-volatile (NV) identity index, wherein the NV identity index is stored within the TPM; and storing the hash of the existing device identity as a new attested device identity in the NV identity index.

18. The system of claim 17, wherein the computer process further comprising attesting the identity of the device in the identify index using an attestation identity key (AIK) of the TPM.

19. The system of claim 17, wherein the computer process further comprising destroying the existing device identity by generating a hash of the existing device identity using a new value of the secret random number.

20. The system of claim 17, wherein the computer process further comprising exposing the identity index to applications using an application programming interface (API) that supports at least one of a create identity call and a change identity call.

* * * * *